US012802604B2

(12) United States Patent
Choi et al.

(10) Patent No.: US 12,802,604 B2
(45) Date of Patent: Nov. 17, 2026

(54) THIN FILM TRANSISTOR UNIT AND DISPLAY DEVICE COMPRISING THE SAME

(71) Applicant: LG Display Co., Ltd., Seoul (KR)

(72) Inventors: YoonJi Choi, Paju-si (KR); DongJae Shin, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 19/229,948

(22) Filed: Jun. 5, 2025

(65) Prior Publication Data

US 2026/0045190 A1 Feb. 12, 2026

(30) Foreign Application Priority Data

Aug. 6, 2024 (KR) ........................ 10-2024-0104337

(51) Int. Cl.
*G09G 3/20* (2006.01)

(52) U.S. Cl.
CPC ....... *G09G 3/20* (2013.01); *G09G 2300/0408* (2013.01); *G09G 2310/0267* (2013.01); *G09G 2310/0281* (2013.01); *G09G 2310/0283* (2013.01); *G09G 2310/0286* (2013.01); *G09G 2330/045* (2013.01)

(58) Field of Classification Search
CPC ................... G09G 3/20; G09G 3/3266; G09G 2300/0408; G09G 2310/0267; G09G 2310/0281; G09G 2310/0283; G09G 2310/0286; G09G 2330/045; G09G 3/2077; G09G 3/3674; H10D 86/40; H10D 86/60; H10D 86/441
See application file for complete search history.

(56) References Cited

U.S. PATENT DOCUMENTS

2023/0197011 A1* 6/2023 Hong .................. G09G 3/3233
345/212

FOREIGN PATENT DOCUMENTS

KR 10-2022-0093444 A 7/2022

OTHER PUBLICATIONS

Ethan L.W. Gardner, Andrea de Luca, Julien Philippe, Daniela Dragomirescu, Florin Udrea, Thin-Film MOSFET-Based Pressure Sensor, Sep. 16, 2019, HAL open science, IEEE Sensors Letters, 3 (7), pp. 1-4. 10.1109/LSENS.2019.2927694. hal-02289295 (Year: 2019).*

* cited by examiner

*Primary Examiner* — Brent D Castiaux
(74) *Attorney, Agent, or Firm* — Morgan, Lewis & Bockius LLP

(57) ABSTRACT

A thin film transistor unit may include a first terminal; a first thin film transistor including a first active layer, a first gate electrode, a first source electrode, and a first drain electrode; a second thin film transistor including a second active layer, a second gate electrode, a second source electrode, and a second drain electrode; a third thin film transistor including a third active layer, a third gate electrode, a third source electrode, and a third drain electrode; a fourth thin film transistor including a fourth active layer, a fourth gate electrode, a fourth source electrode, and a fourth drain electrode; and a second terminal. A same gate voltage may be configured to be simultaneously applied to the first to fourth gate electrodes. The first terminal may be connected to the first and second drain electrodes. The second terminal may be connected to the third and fourth source electrode.

12 Claims, 11 Drawing Sheets

THIN FILM TRANSISTOR UNIT AND DISPLAY DEVICE COMPRISING THE SAME

CROSS-REFERENCE TO RELATED APPLICATIONS

This application claims the benefit of priority of the Korean Patent Application No. 10-2024-0104337, filed on Aug. 6, 2024, which is hereby incorporated by reference as if fully set forth herein.

BACKGROUND

Field

The present disclosure relates to a thin film transistor unit and a display device, and more particularly, to a thin film transistor unit that reduces heat generation temperature and a display device including the thin film transistor unit.

Discussion of the Related Art

As the information society develops, the demand for display devices for displaying images is increasing in various forms, and recently, various display devices, such as liquid crystal displays (LCDs), plasma display panels (PDPs), and organic light emitting diode display devices (OLEDs), are being utilized.

In general, a display device includes a driving circuit for driving a display panel. The driving circuit includes a gate driving circuit that sequentially applies scan signals to gate lines, and a data driving circuit that applies image information to pixels through data lines in response to scan signals of the gate driving circuit.

Recently, research has been continuously conducted to reduce the heat generation temperature in the gate driving circuit of display devices.

In the past, in order to reduce the heat generation temperature in the gate drive circuit, a method of increasing the distance between heat generation sources horizontally or vertically was used. However, although this method can reduce the heat generation temperature by increasing the distance from the heat generation source, it caused a problem of increasing the size of the bezel of the display device.

Therefore, research is continuously being conducted to reduce the heat generation temperature in the gate driving circuit without increasing the size of the bezel of the display device.

SUMMARY

Accordingly, the present disclosure is directed to a thin film transistor unit and a display device comprising the same that substantially obviate one or more problems due to limitations and disadvantages of the related art.

An example embodiment of the present disclosure is to provide a thin film transistor unit having crossed heat sources.

Another example embodiment of the present disclosure is to provide a thin film transistor unit in which heat sources are crossed to reduce heat generation temperature.

Another example embodiment of the present disclosure is to provide a display device having a reduced bezel width including thin film transistor units having crossed heat sources.

Additional advantages and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the present disclosure, as embodied and broadly described herein, a thin film transistor unit includes a first terminal; a first thin film transistor including a first active layer, a first gate electrode, a first source electrode, and a first drain electrode; a second thin film transistor including a second active layer, a second gate electrode, a second source electrode, and a second drain electrode; a third thin film transistor including a third active layer, a third gate electrode, a third source electrode, and a third drain electrode; a fourth thin film transistor including a fourth active layer, a fourth gate electrode, a fourth source electrode, and a fourth drain electrode; and a second terminal, wherein a same gate voltage is configured to be simultaneously applied to the first gate electrode, the second gate electrode, the third gate electrode, and the fourth gate electrode, wherein the first terminal is connected to the first drain electrode and the second drain electrode, the second terminal is connected to the third source electrode and the fourth source electrode, and the third drain electrode is connected to the fourth drain electrode only via the first source electrode, and is connected to the fourth drain electrode only via the second source electrode.

The voltage input to the first terminal may be higher than the voltage input to the second terminal.

In a plan view, the first thin film transistor and the fourth thin film transistor may be disposed adjacently along the first direction, and in a plan view, the second thin film transistor and the third thin film transistor may be disposed adjacently along the first direction.

The first gate electrode can be connected to the second gate electrode only via the third gate electrode and can be connected to the second gate electrode only via the fourth gate electrode.

In a plan view, the first thin film transistor and the third thin film transistor may be disposed adjacently along a second direction perpendicular to the first direction, and in a plan view, the second thin film transistor and the fourth thin film transistor may be disposed adjacently along the second direction.

In a plan view, the first thin film transistor and the second thin film transistor can be disposed adjacently along a diagonal direction between the first direction and the second direction.

In a plan view, the first active layer, the second active layer, the third active layer, and the fourth active layer may form a square in which the first active layer, the second active layer, the third active layer, and the fourth active layer are respectively positioned at the corners of the square, and the first active layer and the second active layer may be positioned on a diagonal of the square, and the third active layer and the fourth active layer may be positioned on another diagonal of the square.

The first active layer, the second active layer, the third active layer, and the fourth active layer can be spaced apart from each other.

The thin film transistor unit further includes a third terminal connected to the first source electrode, the second source electrode, the third drain electrode, and the fourth drain electrode.

The first source electrode, the second source electrode, the third source electrode, the fourth source electrode, the first drain electrode, the second drain electrode, the third drain electrode, the fourth drain electrode, the first gate electrode, the second gate electrode, the third gate electrode, and the fourth gate electrode can be disposed on the same layer.

In another aspect of the present disclosure, a display device includes a display panel in which a plurality of pixels are disposed; and a gate driving circuit configured to supply a plurality of scan signals to the display panel through a plurality of gate lines, wherein the gate driving circuit includes a stage for supplying the scan signals, and the stage includes the thin film transistor unit according to any of the above example embodiments of the present disclosure.

In yet another aspect of the present disclosure, a display device includes a display panel in which a plurality of pixels are disposed; and a gate driving circuit configured to supply a plurality of scan signals to the display panel through a plurality of gate lines, wherein the gate driving circuit includes a stage for supplying the scan signals; and a front dummy stage and a rear dummy stage dependently connected to the stage, wherein the front dummy stage and the rear dummy stage include a feedback transistor, and the feedback transistor includes the thin film transistor unit according to any of the above example embodiments of the present disclosure.

The front dummy stage and the rear dummy stage can be disposed in a corner area of the display panel.

BRIEF DESCRIPTION OF THE DRAWINGS

The accompanying drawings, which are included to provide a further understanding of the present disclosure and are incorporated in and constitute a part of this application, illustrate example embodiments of the present disclosure and together with the description serve to explain various principles of the present disclosure.

DETAILED DESCRIPTION

Figure 1A:
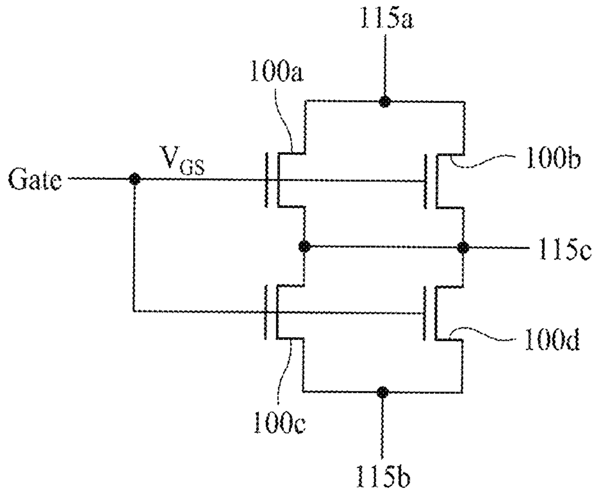
FIG. 1A RELATED ART
FIG. 1A is a circuit diagram of a thin film transistor unit according to a comparative example of the present disclosure.

Advantages and features of the present disclosure and implementation methods thereof will be clarified through following example embodiments described with reference to the accompanying drawings. The present disclosure may, however, be embodied in different forms and should not be construed as limited to the embodiments set forth herein. Rather, these embodiments are provided so that this disclosure will be thorough and complete and will fully convey the scope of the present disclosure to those skilled in the art. Further, the protected scope of the present disclosure may be defined by the claims and their equivalents.

A shape, a size, a ratio, an angle and a number disclosed in the drawings for describing embodiments of the present disclosure are merely examples. Thus, the present disclosure is not limited to the illustrated details. Like reference numerals refer to like elements throughout the specification. In the following description, where the detailed description of the relevant known function or configuration is determined to unnecessarily obscure features of the present disclosure, the detailed description may be omitted.

In a case where terms like "comprise", "have", and "include" described in the present disclosure are used, another portion may be added unless a more limiting term like "only~" is used. The terms of a singular form may include plural forms, and vice versa, unless referred to the contrary.

In construing an element, the element should be construed as including an error band although there is no explicit description.

In describing a position relationship, for example, where the position relationship is described as "upon~", "above~", "below~", and "next to~", one or more portions may be disposed between two other portions unless a more limiting term like "just" or "direct" is used.

Spatially relative terms such as "below", "beneath", "lower", "above", and "upper" may be used herein to easily describe a relationship of one element or elements to another element or elements as illustrated in the drawings. It should be understood that these terms are intended to encompass different orientations of the device in addition to the orientation depicted in the drawings. For example, if the device illustrated in the figure is reversed, the device described to be arranged "below" or "beneath" another device may be arranged "above" another device. Therefore, an example term "below (beneath)" may include "below (beneath)" and "above" orientations. Likewise, an example term "above" or "on" may include "above" and "below (beneath)" orientations.

In describing a temporal relationship, for example, where the temporal order is described as "after," "subsequent,"

"next," and "before," a case which is not continuous may be included, unless a more limiting term like "just" or "direct" is used.

It should be understood that, although the terms "first," "second," etc., may be used herein to describe various elements, these elements should not be limited by these terms. These terms are only used to refer to one element separately from another. For example, a first element could be termed a second element, and, similarly, a second element could be termed a first element, without departing from the scope of the present disclosure.

It should be understood that the term "at least one" includes all combinations related with any one item. For example, "at least one among a first element, a second element and a third element" may include all combinations of two or more elements selected from the first, second and third elements as well as each element of the first, second and third elements.

Features of various embodiments of the present disclosure may be partially or entirely coupled to or combined with each other and may be variously inter-operated with each other and driven technically as those skilled in the art can sufficiently understand. The embodiments of the present disclosure may be carried out independently from each other or may be carried out together in a co-dependent relationship.

In the addition of reference numerals to the components of each drawing describing embodiments of the present disclosure, the same components can have the same reference numeral as can be displayed on the other drawings.

In the embodiments of the present disclosure, a source electrode and a drain electrode are distinguished for convenience of description, and the source electrode and the drain electrode may be interchanged. The source electrode may be the drain electrode and vice versa. In addition, the source electrode of any one embodiment may be a drain electrode in another embodiment, and the drain electrode of any one embodiment may be a source electrode in another embodiment.

In some embodiments of the present disclosure, for convenience of description, a source area may be distinguished from a source electrode, and a drain area may be distinguished from a drain electrode, but embodiments of the present disclosure are not limited thereto. The source area may be the source electrode, and the drain area may be the drain electrode. In addition, the source area may be the drain electrode, and the drain area may be the source electrode.

FIG. 1A is a circuit diagram of a thin film transistor unit (10*a*) according to a comparative example of the present disclosure.

Figure 1B:
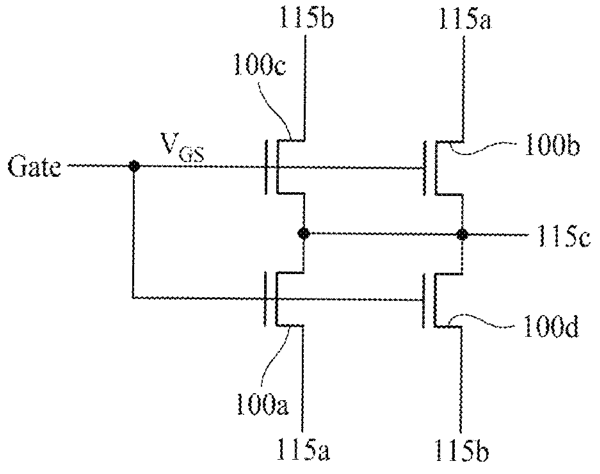
FIG. 1B is a circuit diagram of a thin film transistor unit according to an example embodiment of the present disclosure.

FIG. 1B is a circuit diagram of a thin film transistor unit (10*b*) according to an example embodiment of the present disclosure.

A thin film transistor unit (10*b*) according to an example embodiment of the present disclosure includes a first thin film transistor (100*a*), a second thin film transistor (100*b*), a third thin film transistor (100*c*), and a fourth thin film transistor (100*d*).

FIG. 1B illustrates a thin film transistor unit (10*b*) in which a first thin film transistor (100*a*), a second thin film transistor (100*b*), a third thin film transistor (100*c*), and a fourth thin film transistor (100*d*) are disposed.

According to an example embodiment of the present disclosure, a first thin film transistor (100*a*) includes a first active layer (130*a*), a first gate electrode (150*a*), a first source electrode (161*a*), and a first drain electrode (162*a*).

According to an example embodiment of the present disclosure, the second thin film transistor (100*b*) includes a second active layer (130*b*), a second gate electrode (150*b*), a second source electrode (161*b*), and a second drain electrode (162*b*).

According to an example embodiment of the present disclosure, the third thin film transistor (100*c*) includes a third active layer (130*c*), a third gate electrode (150*c*), a third source electrode (161*c*), and a third drain electrode (162*c*).

According to an example embodiment of the present disclosure, the fourth thin film transistor (100*d*) includes a fourth active layer (130*d*), a fourth gate electrode (150*d*), a fourth source electrode (161*d*), and a fourth drain electrode (162*d*).

A thin film transistor unit (10*b*) according to an example embodiment of the present disclosure includes a first terminal (115*a*) and a second terminal (115*b*).

Here, the voltage input to the first terminal (115*a*) may be higher than the voltage input to the second terminal (115*b*).

Figure 2A:
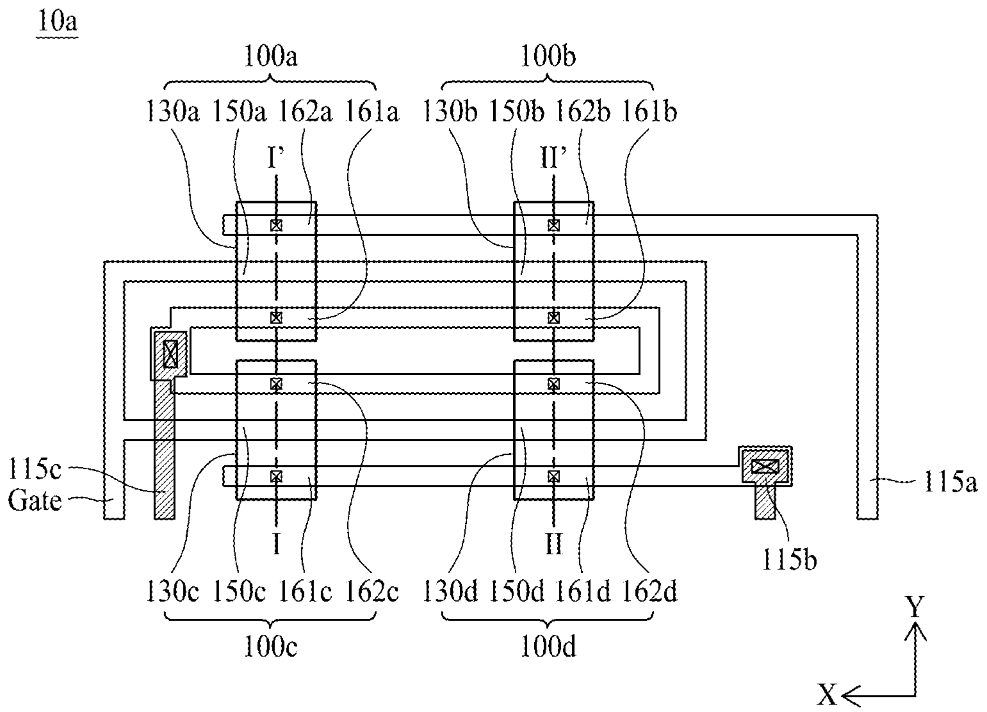
FIG. 2A RELATED ART
FIG. 2A is a plan view of the thin film transistor unit of FIG. 1A.
Figure 2B:
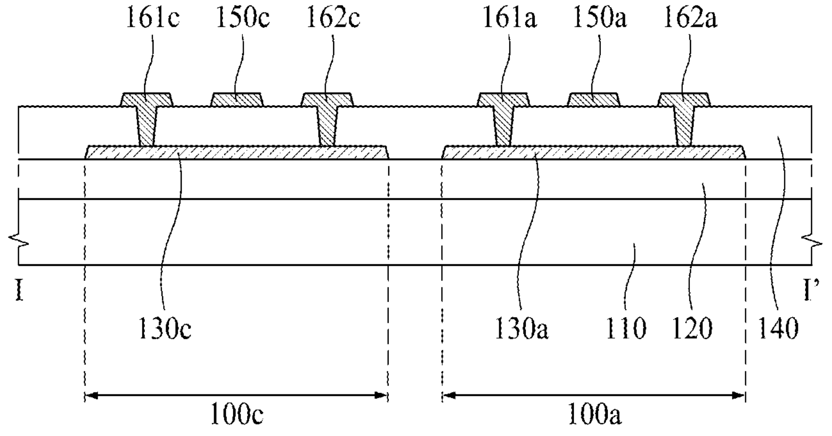
FIG. 2B RELATED ART
FIG. 2B is a cross-sectional view taken along line I-I' in FIG. 2A.
Figure 2C:
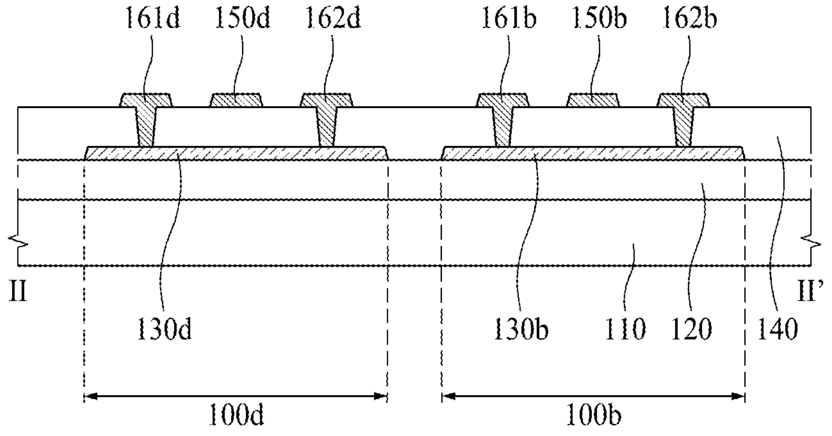
FIG. 2C RELATED ART
FIG. 2C is a cross-sectional view taken along line II-II' in FIG. 2A.

FIG. 2A is a plan view of the thin film transistor unit (10*a*) of FIG. 1A. FIG. 2B is a cross-sectional view taken along line I-I' in FIG. 2A. FIG. 2C is a cross-sectional view taken along line II-II' in FIG. 2A.

As shown in FIG. 2A, a thin film transistor unit (10*a*) according to a comparative example includes a first terminal (115*a*) and a second terminal (115*b*). Here, the first terminal (115*a*) is connected to a first drain electrode (162*a*) of a first thin film transistor (100*a*) and a second drain electrode (162*b*) of a second thin film transistor (100*b*). In addition, the second terminal (115*b*) is connected to a third source electrode (161*c*) of a third thin film transistor (100*c*) and a fourth source electrode (161*d*) of a fourth thin film transistor (100*d*).

According to an example embodiment of the present disclosure, when the first terminal (115*a*) to which a high voltage is input is connected to the drain electrode of a thin film transistor, the thin film transistor can be referred to as a 'heat source' according to the present disclosure.

As shown in FIG. 2A, when a first terminal (115*a*) to which a high voltage is input is connected to a first drain electrode (162*a*) of an adjacent first thin film transistor (100*a*) and a second drain electrode (162*b*) of a second thin film transistor (100*b*), a high voltage is applied to the first drain electrode (162*a*) and the second drain electrode (162*b*). As a result, deterioration may occur in the first drain electrode (162*a*) and the second drain electrode (162*b*) of the first thin film transistor (100*a*) and the second thin film transistor (100*b*). The first thin film transistor (100*a*) and the second thin film transistor (100*b*) may be referred to as a heat source.

As shown in FIG. 2A, when the first gate electrode (150*a*) and the second gate electrode (150*b*) of the first thin film transistor (100*a*) and the second thin film transistor (100*b*), which are heat sources, are connected adjacent to each other and the first thin film transistor (100*a*) and the second thin film transistor (100*b*) are disposed adjacent to each other with respect to the first direction (X), a problem may occur in which the heat generation temperature of the thin film transistor unit (10*a*) including the first thin film transistor (100*a*) and the second thin film transistor (100*b*) increases.

In the past, in order to prevent the heat generation temperature of the thin film transistor unit (10*a*) from rising, a method of increasing the distance between the first thin film transistor (100*a*) and the second thin film transistor (100*b*), which are heat sources, horizontally or vertically, was used.

For example, the distance between the first thin film transistor (100*a*) and the second thin film transistor (100*b*), which are heat sources, increases horizontally, which means that the distance between the first thin film transistor (100*a*) and the second thin film transistor (100*b*) increases along the first direction (X).

In addition, the vertical increase in the distance between the first thin film transistor (100*a*) and the second thin film transistor (100*b*), which are heat sources, means that the distance between the first thin film transistor (100*a*) and the second thin film transistor (100*b*) increases along a direction perpendicular to the first direction (X) and the second direction (Y). Specifically, it means that the distance between the first thin film transistor (100*a*) and the second thin film transistor (100*b*) increases in the thickness direction of the display device (1000).

However, in the comparative example, when the distance between the first thin film transistor (100*a*) and the second thin film transistor (100*b*), which are heat sources, is increased horizontally or vertically to reduce the heat generation temperature, the heat generation temperature can be reduced by increasing the distance from the heat source, but there is a problem that the size of the bezel of the display device (1000) increases.

To solve this problem, the thin film transistor unit (10*b*) according to an example embodiment of the present disclosure can have heat sources intersect each other in a plan view.

As shown in FIG. 1B, the first thin film transistor (100*a*) and the second thin film transistor (100*b*) connected to the first terminal (115*a*) can be disposed diagonally to each other.

Figure 3A:
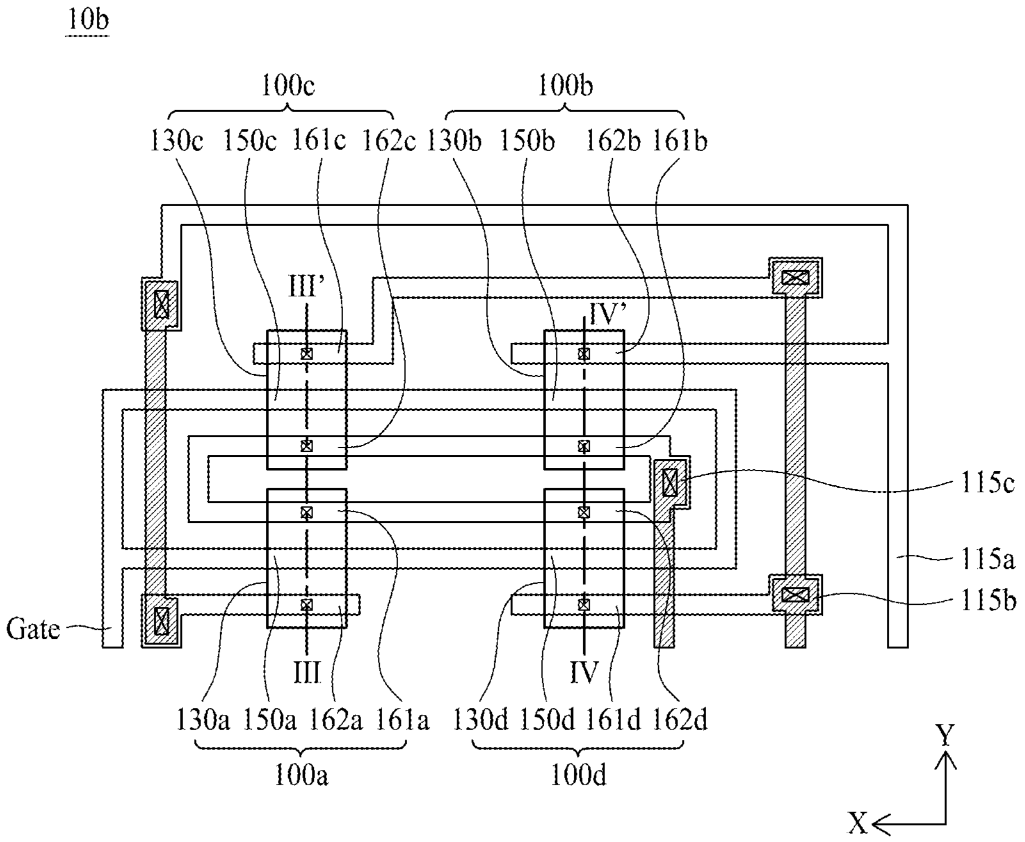
FIG. 3A is a plan view of the thin film transistor unit of FIG. 1B.
Figure 3B:
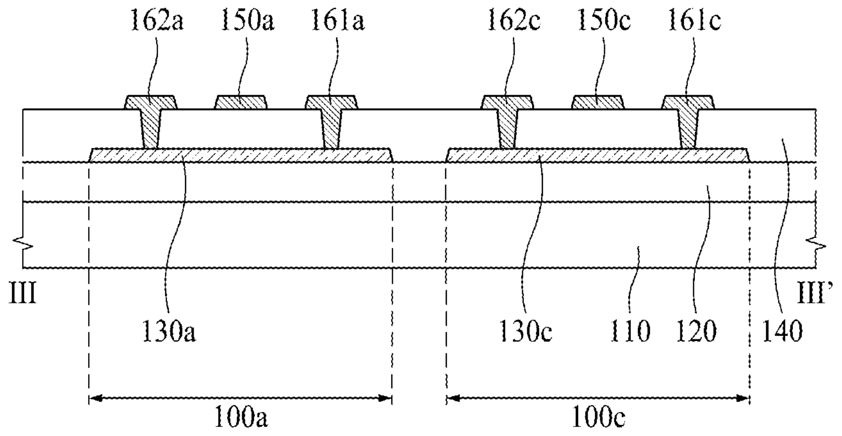
FIG. 3B is a cross-sectional view taken along line III-III' in FIG. 3A.
Figure 3C:
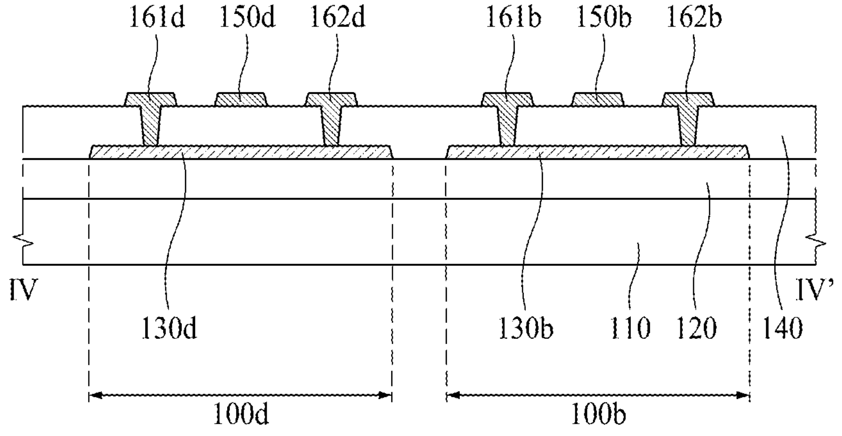
FIG. 3C is a cross-sectional view taken along line IV-IV' in FIG. 3A.

FIG. 3A is a plan view of the thin film transistor unit (10*b*) of FIG. 1B. FIG. 3B is a cross-sectional view taken along line III-III' in FIG. 3A. FIG. 3C is a cross-sectional view taken along line IV-IV' in FIG. 3A.

According to an example embodiment of the present disclosure, the first terminal (115*a*) of the thin film transistor unit (10*b*) is connected to the first drain electrode (162*a*) and the second drain electrode (162*b*), and the second terminal (115*b*) is connected to the third source electrode (161*c*) and the fourth source electrode (161*d*). In addition, the third drain electrode (162*c*) may be connected to the fourth drain electrode (162*d*) only via the first source electrode (161*a*), and may be connected to the fourth drain electrode (162*d*) only via the second source electrode (161*b*). That is, as shown in FIG. 3A, the third drain electrode (162*c*) is connected to the first source electrode (161*a*), the first source electrode (161*a*) is then connected to the fourth drain electrode (162*d*), the fourth drain electrode (162*d*) is then connected to the second source electrode (161*b*), and the second source electrode (161*b*) is then connected back to the third drain electrode (162*c*), thereby forming a loop connection in which the third drain electrode (162*c*), the first source electrode (161*a*), the fourth drain electrode (162*d*), and the second source electrode (161*b*) are connected in sequence.

As shown in FIG. 3A, a first terminal (115*a*) is connected to a first drain electrode (162*a*) and a second drain electrode (162*b*) of a first thin film transistor (100*a*) and a second thin film transistor (100*b*) which are disposed diagonally from each other.

As a result, it is possible to prevent or reduce the heat generation temperature of the thin film transistor unit (10*b*) from rising by increasing the distance between heat sources without increasing the distance between the first thin film transistor (100*a*) and the second thin film transistor (100*b*) in the horizontal or vertical direction.

According to an example embodiment of the present disclosure, in a plan view, the first thin film transistor (100*a*) and the fourth thin film transistor (100*d*) are disposed adjacently along the first direction (X), and the second thin film transistor (100*b*) and the third thin film transistor (100*c*) are disposed adjacently along the first direction (X).

In FIG. 3A, a first thin film transistor (100*a*) connected to a first terminal (115*a*) and a fourth thin film transistor (100*d*) connected to a second terminal (115*b*) are disposed adjacent to each other along a first direction (X), and a second thin film transistor (100*b*) connected to the first terminal (115*a*) and a third thin film transistor (100*c*) connected to the second terminal (115*b*) are disposed adjacent to each other along the first direction (X).

Due to this, the first thin film transistor (100*a*) and the second thin film transistor (100*b*) connected to the first terminal (115*a*) to which a high voltage is input are disposed in different rows, thereby preventing or reducing the heat generation temperature of the thin film transistor unit (10*b*) from rising.

According to an example embodiment of the present disclosure, the same gate voltage can be simultaneously applied to the first gate electrode (150*a*), the second gate electrode (150*b*), the third gate electrode (150*c*), and the fourth gate electrode (150*d*).

As shown in FIG. 3A, the gate voltage (VGS) through the gate electrode (Gate) is simultaneously applied to the first gate electrode (150*a*), the second gate electrode (150*b*), the third gate electrode (150*c*), and the fourth gate electrode (150*d*).

According to an example embodiment of the present disclosure, the first gate electrode (150*a*) can be connected to the second gate electrode (150*b*) only through the third gate electrode (150*c*), and can be connected to the second gate electrode (150*b*) only through the fourth gate electrode (150*d*).

As shown in FIG. 3A, the first gate electrode (150*a*) is connected to the second gate electrode (150*b*) only via the third gate electrode (150*c*). Specifically, no other gate electrode is disposed between the first gate electrode (150*a*) and the third gate electrode (150*c*), and no other gate electrode is disposed between the third gate electrode (150*c*) and the second gate electrode (150*b*).

In addition, the first gate electrode (150*a*) is connected to the second gate electrode (150*b*) only via the fourth gate electrode (150*d*). Specifically, no other gate electrode is disposed between the first gate electrode (150*a*) and the fourth gate electrode (150*d*), and no other gate electrode is disposed between the fourth gate electrode (150*d*) and the second gate electrode (150*b*).

According to an example embodiment of the present disclosure, in a plan view, the first thin film transistor (100*a*) and the third thin film transistor (100*c*) are disposed adjacently along a second direction (Y) perpendicular to the first direction (X), and the second thin film transistor (100*b*) and the fourth thin film transistor (100*d*) are disposed adjacently along a second direction (Y) perpendicular to the first direction (X).

As shown in FIGS. 3A, 3B, and 3C, a first thin film transistor (100*a*) connected to a first terminal (115*a*) and a third thin film transistor (100*c*) connected to a second terminal (115*b*) are disposed adjacent to each other along the second direction (Y), and a second thin film transistor (100*b*) connected to the first terminal (115*a*) and a fourth thin film transistor (100*d*) connected to the second terminal (115*b*) are disposed adjacent to each other along the second direction (Y).

Due to this, the first thin film transistor (100*a*) and the second thin film transistor (100*b*) connected to the first terminal (115*a*) to which a high voltage is input are disposed in different columns, thereby preventing or reducing the heat generation temperature of the thin film transistor unit (10*b*) from rising.

Specifically, the first thin film transistor (100*a*) and the second thin film transistor (100*b*) are disposed adjacently along a diagonal direction between the first direction (X) and the second direction (Y) on a plane.

When the first thin film transistor (100*a*) and the second thin film transistor (100*b*) are disposed diagonally on a plan view, the heat generation temperature of the thin film transistor unit (10*b*) can be prevented or suppressed from rising by increasing the distance between the heat sources without increasing the distance between the first thin film transistor (100*a*) and the second thin film transistor (100*b*), which are heat sources, in the horizontal or vertical direction.

According to an example embodiment of the present disclosure, the first active layer (130*a*), the second active layer (130*b*), the third active layer (130*c*), and the fourth active layer (130*d*) in a planar form a rectangle in which the first active layer (130*a*), the second active layer (130*b*), the third active layer (130*c*), and the fourth active layer (130*d*) are respectively positioned at the corners, and the first active layer (130*a*) and the second active layer (130*b*) may be positioned on a diagonal of the rectangle, and the third active layer (130*c*) and the fourth active layer (130*d*) may be positioned on another diagonal of the rectangle.

According to an example embodiment of the present disclosure, the first active layer (130*a*), the second active layer (130*b*), the third active layer (130*c*), and the fourth active layer (130*d*) can be disposed spaced apart from each other.

When the first active layer (130*a*) of the first thin film transistor (100*a*), which is a heat source, is formed integrally with the active layer of an adjacent thin film transistor, a problem may arise in which the heat generation temperature rises throughout the integrally formed active layer.

For example, in the case where the first active layer (130*a*) of the first thin film transistor (100*a*), which is a heat source in FIG. 3A, is formed integrally with the third active layer (130*c*) or the fourth active layer (130*d*) of the adjacent third thin film transistor (100*c*) or the fourth thin film transistor (100*d*), the area where heat is generated is not limited to the first thin film transistor (100*a*) but can be expanded to the adjacent third thin film transistor (100*c*) or the fourth thin film transistor (100*d*).

Therefore, to reduce the heat generation temperature of the thin film transistor unit (10*b*) according to an example embodiment of the present disclosure, the first active layer (130*a*), the second active layer (130*b*), the third active layer (130*c*), and the fourth active layer (130*d*) need to be disposed spaced apart from each other.

According to an example embodiment of the present disclosure, the thin film transistor unit (10*b*) may further include a third terminal (115*c*).

According to an example embodiment of the present disclosure, the third terminal (115*c*) can be connected to the first source electrode (161*a*), the second source electrode (161*b*), the third drain electrode (162*c*), and the fourth drain electrode (162*d*).

FIG. 3A illustrates a third terminal (115*c*) connected to a first source electrode (161*a*), a second source electrode (161*b*), a third drain electrode (162*c*), and a fourth drain electrode (162*d*). However, example embodiments of the present disclosure are not limited thereto, and the first source electrode (161*a*), the second source electrode (161*b*), the third drain electrode (162*c*), and the fourth drain electrode (162*d*) may be in a floating state.

According to an example embodiment of the present disclosure, the first thin film transistor (100*a*), the second thin film transistor (100*b*), the third thin film transistor (100*c*), and the fourth thin film transistor (100*d*) each include a base substrate (110), a buffer layer (120) on the base substrate (110), an active layer (130*a*, 130*b*, 130*c*, 130*d*) on the buffer layer (120), a gate insulating film (140) on the active layer (130*a*, 130*b*, 130*c*, 130*d*), a gate electrode (150*a*, 150*b*, 150*c*, 150*d*) on the gate insulating film (140), a source electrode (161*a*, 161*b*, 161*c*, 161*d*), and a drain electrode (162*a*, 162*b*, 162*c*, 162*d*).

The respective configurations of the first thin film transistor (100*a*), the second thin film transistor (100*b*), the third thin film transistor (100*c*), and the fourth thin film transistor (100*d*) are described in detail below.

Glass or plastic may be used as the base substrate (110). A transparent plastic having flexible properties, for example, polyimide, may be used as the plastic. As shown in FIGS. 3B and 3C, the base substrate (110) on which the active layers (130*a*, 130*b*, 130*c*, 130*d*) are disposed may be formed integrally.

According to an example embodiment of the present disclosure, a buffer layer (120) may be disposed on a base substrate (110).

The buffer layer (120) has insulating properties and protects the active layers (130*a*, 130*b*, 130*c*, 130*d*). The buffer layer (120) may include at least one of insulating silicon oxide (SiOx), silicon nitride (SiNx), and metal oxide. The buffer layer (120) on which the active layers (130*a*, 130*b*, 130*c*, 130*d*) are disposed may be formed integrally.

The active layers (130*a*, 130*b*, 130*c*, 130*d*) can be disposed on the buffer layer (120).

The active layers (130*a*, 130*b*, 130*c*, 130*d*) each include an oxide semiconductor material. According to an example embodiment of the present disclosure, the active layers (130*a*, 130*b*, 130*c*, 130*d*) are oxide semiconductor layers made of an oxide semiconductor material. For example, the active layers (130*a*, 130*b*, 130*c*, 130*d*) may include at least one of an IZO (InZnO)-based, an IGO (InGaO)-based, an ITO (InSnO)-based, an IGZO (InGaZnO)-based, an IGZTO (InGaZnSnO)-based, a GZTO (GaZnSnO)-based, a GZO (GaZnO)-based, a GO (GaO)-based, and an ITZO (InSnZnO)-based oxide semiconductor material. However, example embodiments of the present disclosure are not limited thereto, and the active layer (130*a*, 130*b*, 130*c*, 130*d*) may be formed using other oxide semiconductor materials known in the art.

The gate insulating film (140) is disposed on the active layers (130*a*, 130*b*, 130*c*, 130*d*). The gate insulating film (140) may include at least one of silicon oxide and silicon nitride, and may also include a metal oxide or a metal nitride. The gate insulating film (140) may have a single film structure or a multilayer film structure. The gate insulating film (140) may be disposed to cover the entire upper surface of the buffer layer (120).

The gate insulating film (140) may be formed by an atomic layer deposition (ALD) method or a metal organic chemical vapor deposition (MOCVD) method. The gate insulating film (140) may or may not be patterned. FIGS.

3B, 3C, 4B, and 4C disclose a structure in which the gate insulating film (140) is not patterned.

The gate electrodes (150*a*, 150*b*, 150*c*, 150*d*) are disposed on a gate insulating film (140). The gate electrodes (150*a*, 150*b*, 150*c*, 150*d*) are spaced apart from the active layers (130*a*, 130*b*, 130*c*, 130*d*), respectively, and overlap at least partially with the active layers (130*a*, 130*b*, 130*c*, 130*d*).

The gate electrode (150*a*, 150*b*, 150*c*, 150*d*) may include at least one of an aluminum series metal such as aluminum (Al) or an aluminum alloy, a silver series metal such as silver (Ag) or a silver alloy, a copper series metal such as copper (Cu) or a copper alloy, a molybdenum series metal such as molybdenum (Mo) or a molybdenum alloy, chromium (Cr), tantalum (Ta), neodymium (Nd), and titanium (Ti). The gate electrode (150*a*, 150*b*, 150*c*, 150*d*) may also have a multi-layer film structure including at least two conductive films having different physical properties.

The source electrodes (161*a*, 161*b*, 161*c*, 161*d*) and drain electrodes (162*a*, 162*b*, 162*c*, 162*d*) are disposed on the gate insulating film (140).

The source electrodes (161*a*, 161*b*, 161*c*, 161*d*) and the drain electrodes (162*a*, 162*b*, 162*c*, 162*d*) are spaced apart from each other and are respectively connected to the active layers (130*a*, 130*b*, 130*c*, 130*d*). The source electrodes (161*a*, 161*b*, 161*c*, 161*d*) and the drain electrodes (162*a*, 162*b*, 162*c*, 162*d*) are respectively connected to the active layers (130*a*, 130*b*, 130*c*, 130*d*) through contact holes formed in the gate insulating film (140).

The source electrodes (161*a*, 161*b*, 161*c*, 161*d*) and the drain electrodes (162*a*, 162*b*, 162*c*, 162*d*) may each include at least one of molybdenum (Mo), aluminum (Al), chromium (Cr), gold (Au), titanium (Ti), nickel (Ni), neodymium (Nd), copper (Cu), and alloys thereof. The source electrodes (161*a*, 161*b*, 161*c*, 161*d*) and the drain electrodes (162*a*, 162*b*, 162*c*, 162*d*) may each be formed of a single layer made of a metal or an alloy of metals, or may be formed of multilayers including two or more layers.

According to an example embodiment of the present disclosure, the gate electrode (150*a*, 150*b*, 150*c*, 150*d*), the source electrode (161*a*, 161*b*, 161*c*, 161*d*), and the drain electrode (162*a*, 162*b*, 162*c*, 162*d*) can be formed on the same layer.

Specifically, FIGS. 3B, 3C, 4B, and 4C illustrate a gate electrode (150*a*, 150*b*, 150*c*, 150*d*), a source electrode (161*a*, 161*b*, 161*c*, 161*d*), and a drain electrode (162*a*, 162*b*, 162*c*, 162*d*) being formed on a gate insulating film (140).

Figure 4A:
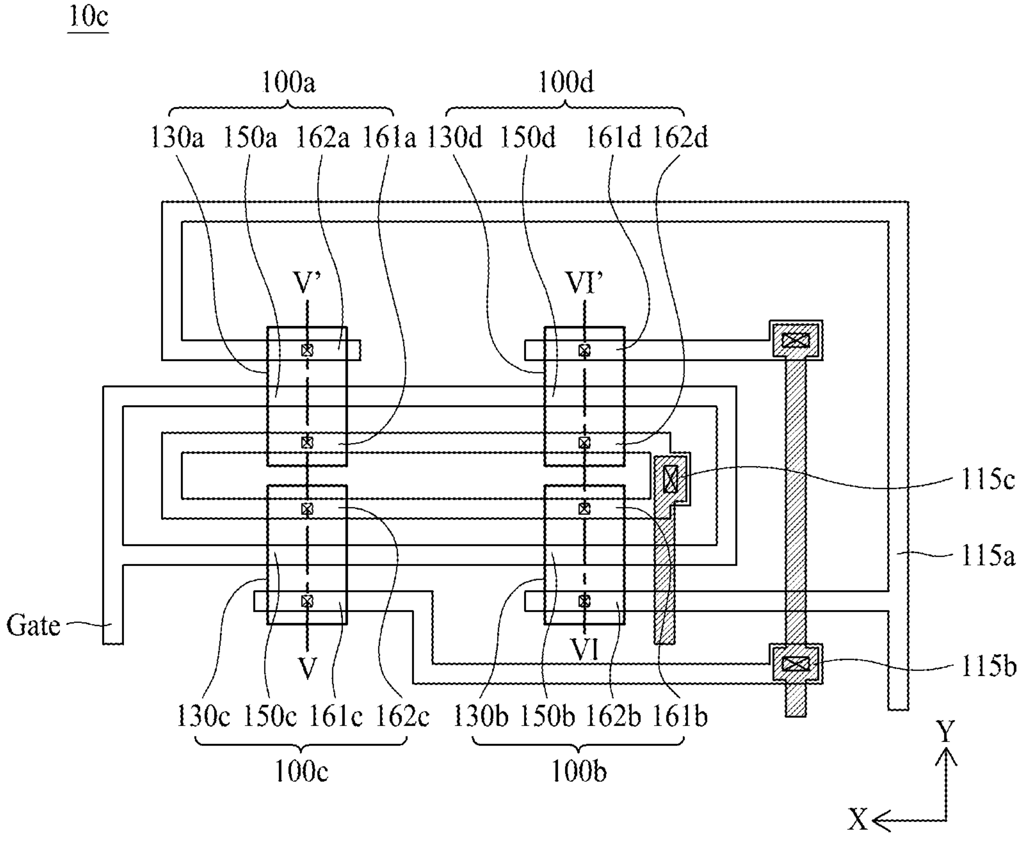
FIG. 4A is a plan view of a thin film transistor unit according to another example embodiment of the present disclosure.
Figure 4B:
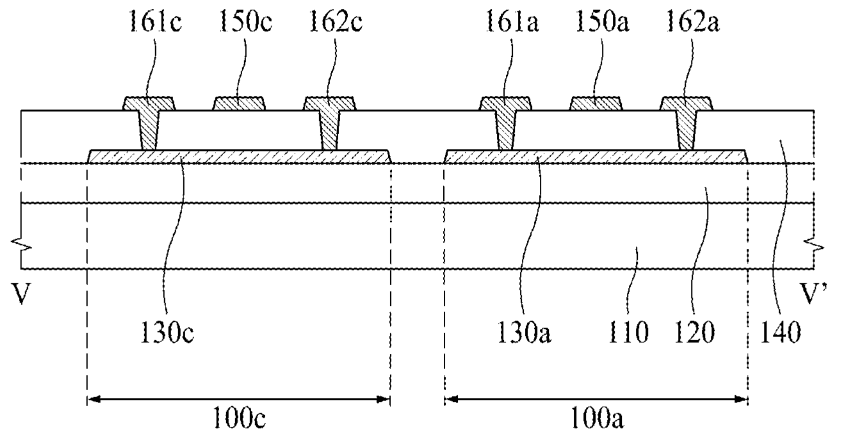
FIG. 4B is a cross-sectional view taken along line V-V' in FIG. 4A.
Figure 4C:
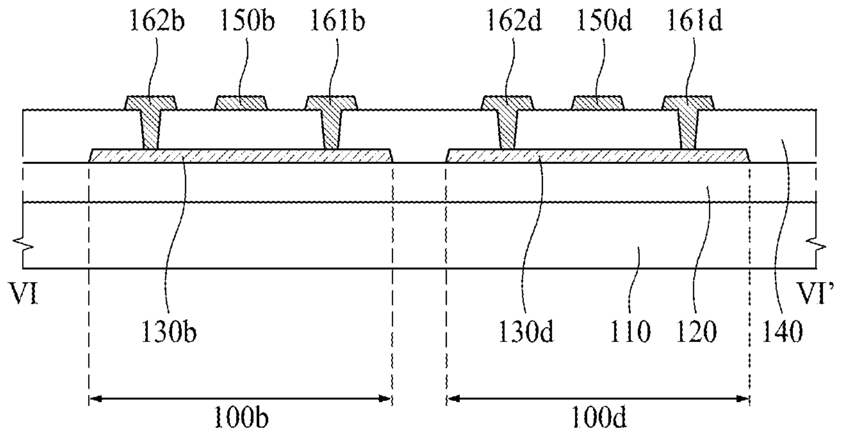
FIG. 4C is a cross-sectional view taken along line VI-VI' in FIG. 4A.

FIG. 4A is a plan view of a thin film transistor unit (10*c*) according to another embodiment of the present disclosure. FIG. 4B is a cross-sectional view taken along line V-V' in FIG. 4A. FIG. 4C is a cross-sectional view taken along line VI-VI' in FIG. 4A.

The thin film transistor unit (10*c*) of FIGS. 4A, 4B, and 4C has different positions of the first thin film transistor (100*a*), the second thin film transistor (100*b*), the third thin film transistor (100*c*), and the fourth thin film transistor (100*d*) compared to the thin film transistor unit (10*b*) of FIGS. 3A, 3B, and 3C.

Specifically, in the thin film transistor unit (10*b*) of FIGS. 3A, 3B and 3C, the first thin film transistor (100*a*) and the second thin film transistor (100*b*), which are connected to the first terminal (115*a*) to which a high voltage is input, are respectively disposed at the lower left and upper right in a plane.

However, specifically, in the thin film transistor unit (10*c*) of FIGS. 4A, 4B and 4C, the first thin film transistor (100*a*) and the second thin film transistor (100*b*), which are connected to the first terminal (115*a*) to which a high voltage is input, are respectively disposed at the upper left and lower right in a plane.

According to an example embodiment of the present disclosure, the first thin film transistor (100*a*) and the second thin film transistor (100*b*), which are heat sources, must be disposed diagonally adjacent to each other, but are not limited to the diagonal direction toward the upper right and the diagonal direction toward the lower right.

Figure 5:
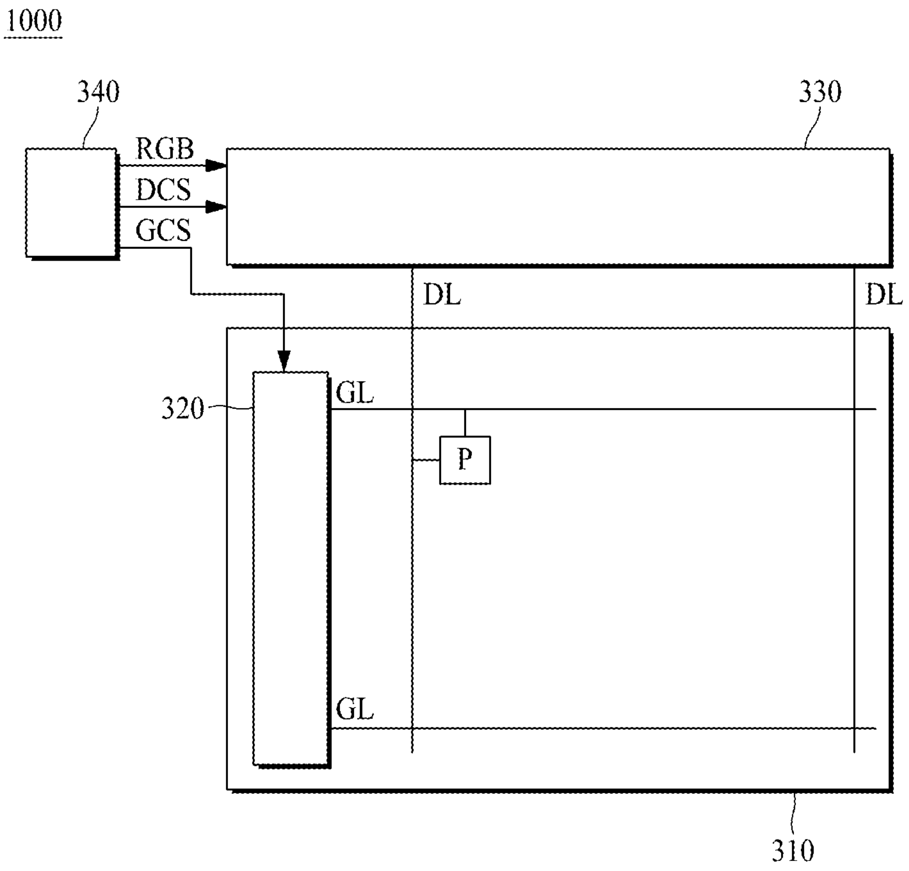
FIG. 5 is a schematic diagram of a display device according to another example embodiment of the present disclosure.

FIG. 5 is a schematic diagram of a display device (1000) according to another embodiment of the present disclosure.

A display device (1000) according to another embodiment of the present disclosure may include a display panel (310), a gate driving circuit (320), a data driving circuit (330), and a control unit (340), as illustrated in FIG. 5.

The display panel (310) includes gate lines (GL) and data lines (DL), and pixels (P) are disposed at intersections of the gate lines (GL) and the data lines (DL). An image is displayed by driving the pixels (P). The gate lines (GL), data lines (DL), and pixels (P) may be disposed on a base substrate (110).

The control unit (340) controls the gate driving circuit (320) and the data driving circuit (330).

The control unit (340) outputs a gate control signal (GCS) for controlling the gate driving circuit (320) and a data control signal (DCS) for controlling the data driving circuit (330) using a signal supplied from an external system (not shown). In addition, the control unit (340) samples input image data input from an external system, rearranges it, and supplies redisposed digital image data (RGB) to the data driving circuit (330).

The gate control signal (GCS) includes a gate start pulse (GSP), a gate shift clock (GSC), a gate output enable signal (GOE), a start signal (Vst), and a gate clock (GCLK). In addition, the gate control signal (GCS) may include control signals for controlling the gate driving circuit (330).

The data control signal (DCS) includes the source start pulse (SSP), the source shift clock signal (SSC), the source output enable signal (SOE), and the polarity control signal (POL).

The data driving circuit (330) supplies data voltage to the data lines (DL) of the display panel (310). Specifically, the data driving circuit (330) converts image data (RGB) input from the control unit (340) into analog data voltage and supplies the data voltage to the data lines (DL).

According to an example embodiment of the present disclosure, the gate driving circuit (320) may be mounted on the display panel (310). In this way, a structure in which the gate driving circuit (320) is directly mounted on the display panel (310) is called a Gate In Panel (GIP) structure. Specifically, in the Gate In Panel (GIP) structure, the gate driving circuit (320) may be disposed on the base substrate (110).

A display device (1000) according to an example embodiment of the present disclosure may include the thin film transistor unit (10*b*, 10*c*) described above. According to an example embodiment of the present disclosure, a gate driving circuit (320) may include the thin film transistor unit (10*b*, 10*c*) described above.

Figure 6:
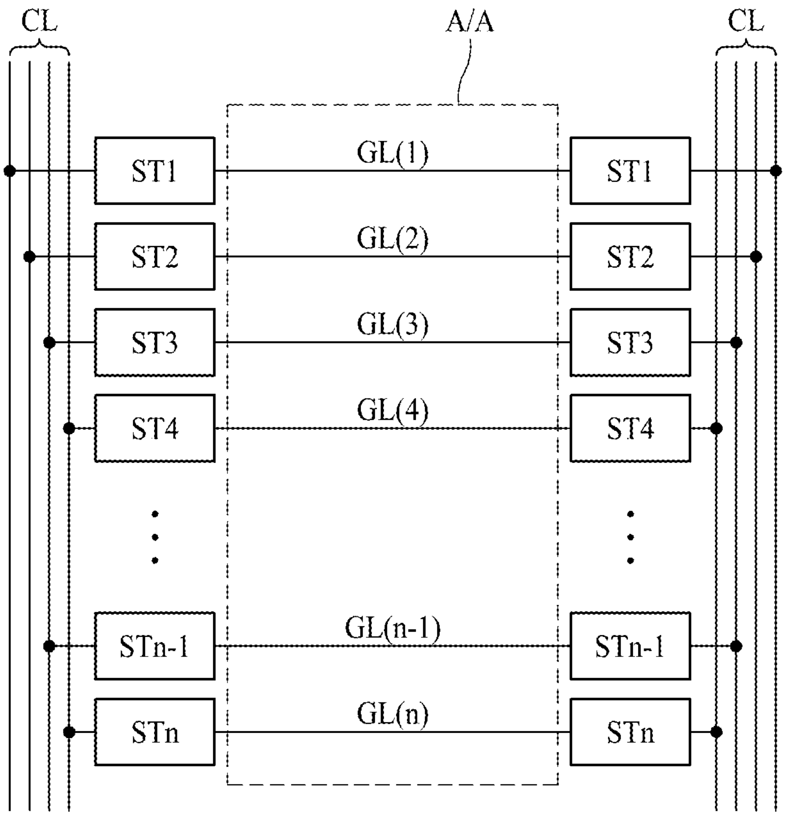
FIG. 6 is a drawing showing an example of a display panel in which a gate driving circuit is implemented as a GIP type in a display device.

FIG. 6 is a drawing showing an example of a display panel (310) in which a gate driving circuit (320) is implemented as a GIP type in a display device (1000).

As shown in FIG. 6, n gate lines (GL(1) to GL(n), where n is a natural number) may be disposed in a display area (A/A) that displays an image on a display panel (310) in a display device (1000).

At this time, the gate driving circuit (320) is built into and disposed in a non-display area corresponding to the periphery of the display area (A/A) of the display panel (310), and may include n gate lines (GL(1) to GL(n), where n is a natural number) and n stages (ST1 to STn) corresponding to each other.

Figure 7:
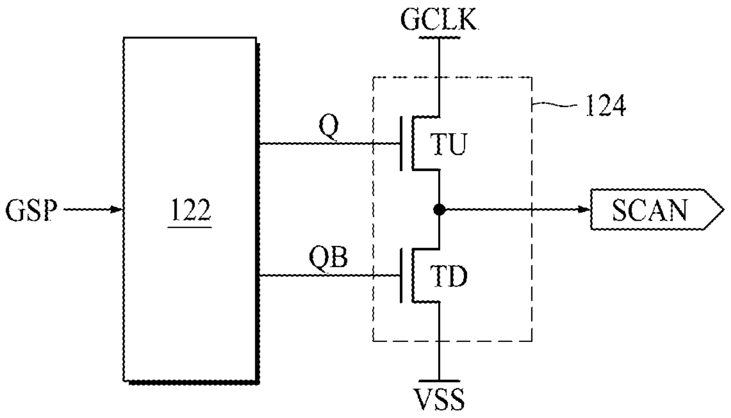
FIG. 7 is a drawing showing a schematic configuration of a stage provided in the gate driving circuit of FIG. 5.

Therefore, n stages (ST1 to STn) can output scan signals (SCAN) to n gate lines (GL(1) to GL(n), where n is a natural number) (see FIG. 7).

As shown in FIG. 6, a gate driving circuit (320) is formed on the left and right sides and supplies a scan signal (SCAN) to n gate lines (GL(1) to GL(n), where n is a natural number) formed on the display panel (310).

Specifically, FIG. 6 illustrates a case where n stages (ST1 to STn) are disposed on the left and right, respectively.

Here, the left gate driving circuit and the right gate driving circuit output the scan signal (SCAN) to the same gate line (GL) at the same time in a double feeding manner. However, example embodiments of the present disclosure are not limited thereto.

A plurality of clock signal lines (CL) may be disposed in a non-display area corresponding to the periphery of the display area (A/A) of the display panel (310) to transmit a gate clock required for generating and outputting a scan signal (SCAN) to the gate driving circuit (320).

FIG. 7 is a drawing showing a schematic configuration of a stage (ST) provided in the gate driving circuit (320) of FIG. 5.

As shown in FIG. 7, one stage (ST) in the display device (1000) means any one of the n stages (ST1 to STn) of FIG. 6, and one stage (ST) may include a control circuit (122) and a buffer circuit (124).

The stage (ST) starts operating in response to a gate start pulse (GSP) and outputs a scan signal (SCAN) in response to a gate clock (GCLK). The scan signals (SCAN) output from the stage (ST) are sequentially shifted and sequentially supplied through the gate line (GL).

The buffer circuit (124) includes two nodes (Q, QB) that are most important in the gate driving state, and may include a pull-up transistor (TU) and a pull-down transistor (TD). Here, the gate node of the pull-up transistor (TU) may correspond to the Q node, and the gate node of the pull-down transistor (TD) may correspond to the QB node.

The control circuit (122) can be used to generate a scan signal (SCAN) synchronized to the gate clock (GCLK).

The control circuit (122) can control the Q node and QB node connected to the buffer circuit (124) so that the buffer circuit (124) can output a scan signal (SCAN), and for this purpose, can include a plurality of transistors.

The control circuit (122) starts to generate a scan signal (SCAN), and the output of the control circuit (122) is sequentially turned on according to the gate clock (GCLK). That is, by controlling the output time of the control circuit (122) using the gate clock (GCLK), it is possible to sequentially transmit it to the buffer circuit (124) that determines the on/off of the gate line (GL).

According to this control circuit (122), the voltage states of each of the Q node and the QB node of the buffer circuit (124) can change. Accordingly, the buffer circuit (124) can output a voltage to the corresponding gate line (GL) for turning on the corresponding gate line (GL), or output a voltage to the corresponding gate line (GL) for turning off the corresponding gate line (GL).

At this time, the control circuit (122) and buffer circuit (124) constituting one stage (ST) can be connected in various structures.

Figure 8:
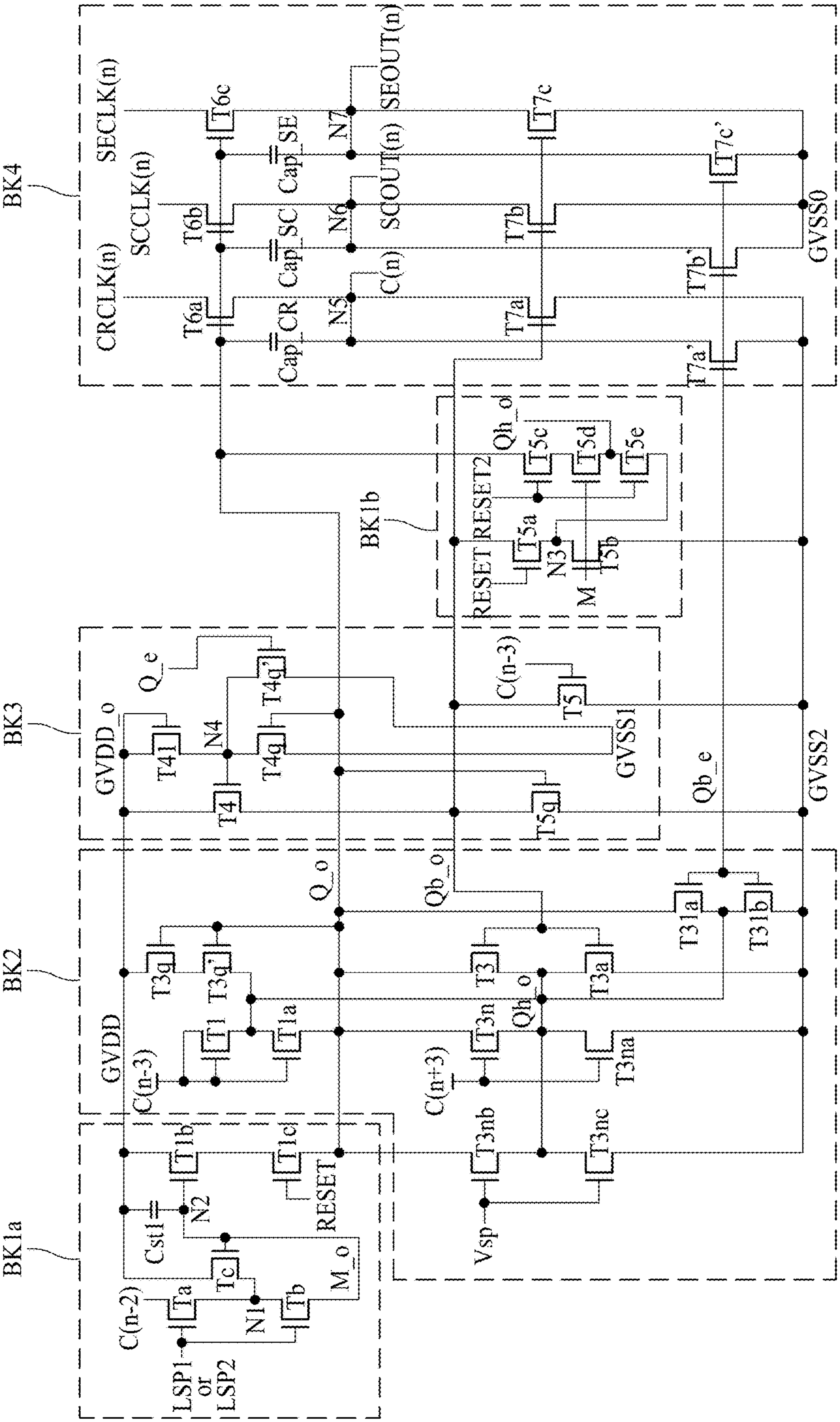
FIG. 8 is a circuit diagram of an example embodiment of a stage provided in the gate driving circuit of FIG. 5.

FIG. 8 is a circuit diagram according to an example embodiment of a stage (ST) provided in the gate driving circuit (320) of FIG. 5.

As shown in FIG. 8, a stage (ST) according to an example embodiment of the present disclosure includes a M_o node, a Q_o node, a Q_e node, a Qb_o node, a Qb_e node, and a Qh_o node.

As shown in FIG. 8, the stage (ST) includes a first sensing control block (BK1*a*), a second sensing control block (BK1*b*), an input block (BK2), an inverter block (BK3), and an output block (BK4).

The first sensing control block (BK1*a*) applies a carry signal C(n−2) to the node M_o according to the line sampling signals (LSP1, LSP2) to activate the potential of the node M_o to the high-potential power supply voltage GVDD, and activates the potential of the node Q_o to the high-potential power supply voltage GVDD according to the activation potential of the node M_o and the global reset signal (RESET).

For this purpose, the first sensing control block (BK1*a*) includes a plurality of transistors (Ta, Tb, Tc, T1*b*, T1*c*) and a capacitor (Cst1).

Transistor Ta includes a gate electrode to which line sampling signals (LSP1, LSP2) are applied, a drain electrode to which a carry signal C(n−2) is applied, and a source electrode connected to node N1. Transistor Tb includes a gate electrode to which line sampling signals (LSP1, LSP2) are applied, a drain electrode connected to node N1, and a source electrode connected to node M_o. Transistor Tc includes a gate electrode connected to node N2, a drain electrode to which a high-potential power supply voltage GVDD is applied, and a source electrode connected to node N1. Transistor T1*b* includes a gate electrode connected to node N2, a drain electrode to which a high-potential power supply voltage GVDD is applied, and a source electrode connected to the drain electrode of transistor T1*c*. Capacitor Cst1 is connected between an input terminal of the high-potential power supply voltage GVDD and node N2 to maintain an activation potential of node M_o. Transistor T1*c* includes a gate electrode to which a global reset signal (RESET) is applied, a drain electrode connected to the source electrode of transistor T1*b*, and a source electrode connected to node Q_o.

According to an example embodiment of the present disclosure, the transistors Ta, Tb, T1*b*, and T1*c* of the first sensing control block (BK1*a*) may each include a thin film transistor unit (10*b*, 10*c*) according to an example embodiment of the present disclosure.

The second sensing control block (BK1*b*) deactivates the potential of node Qb_o to the low potential power supply voltage GVSS2 according to the global reset signal (RESET) and the potential of node M.

To this end, the second sensing control block (BK1*b*) includes a plurality of transistors (T5*a*, T5*b*, T5*c*, T5*d*, T5*e*). The transistor T5*a* includes a gate electrode to which a global reset signal (RESET) is applied, a drain electrode connected to a node Qb_o, and a source electrode connected to a node N3. The transistor T5*b* includes a gate electrode connected to a node M, a drain electrode connected to a node N3, and a source electrode to which a low-potential power supply voltage GVSS2 is applied. The transistor T5*c* includes a gate electrode to which a second global reset signal (RESET2) is applied, a drain electrode connected to a node Q_o, and a source electrode connected to the drain electrode of the transistor T5*d*. The transistor T5*d* includes a gate electrode to which a second global reset signal (RESET2) is applied, a drain electrode connected to the source electrode of the transistor T5*c*, and a source electrode connected to the node Qh_o. Transistor T5*e* includes a gate electrode to which a second global reset signal (RESET2) is applied, a drain electrode connected to node Qh_o, and a source electrode connected to node N3.

The input block (BK2) applies a carry signal C(n−3) to the node Q_o to activate the potential of the node Qh_o to the high-potential power supply voltage GVDD. The second sensing control block (BK1*b*) deactivates the potential of the node Q_o to the low-potential power supply voltage GVSS2 according to the carry signal C(n+3). The second sensing control block (BK1*b*) deactivates the potential of the node Q_o to the low-potential power supply voltage GVSS2 according to the potential of the node Qb_o or Qb_e. The second sensing control block (BK1*b*) deactivates the potential of the node Q_o to the low-potential power supply voltage GVSS2 according to the global start pulse (Vsp).

For this purpose, the input block (BK2) includes a plurality of transistors (T1, T1*a*, T3*q*, T3*q*', T3*n*, T3*na*, T3, T3*a*, T31*a*, T31*b*, T3*nb*, T3*nc*). The transistor T1 includes a gate electrode to which a carry signal C(n−3) is applied, a drain electrode, and a source electrode connected to a node Qh_o. The transistor T1*a* includes a gate electrode to which a carry signal C(n−3) is applied, a drain electrode connected to the node Qh_o, and a source electrode connected to the node Q_o. The transistor T3*q* includes a gate electrode connected to the node Q_o, a drain electrode to which a high-potential power supply voltage GVDD is applied, and a source electrode connected to the drain electrode of the transistor T3*q*'. The transistor T3*q*' includes a gate electrode connected to the node Q_o, a drain electrode connected to the source electrode of the transistor T3*q*, and a source electrode connected to the node Qh_o. The transistor T3*n* includes a gate electrode to which a carry signal C(n+3) is applied, a drain electrode connected to a node Q_o, and a source electrode connected to a node Qh_o. The transistor T3*na* includes a gate electrode to which a carry signal C(n+3) is applied, a drain electrode connected to a node Qh_o, and a source electrode to which a low-potential power supply voltage GVSS2 is applied. The transistor T3 includes a gate electrode connected to a node Qb_o, a drain electrode connected to a node Q_o, and a source electrode connected to a node Qh_o. The transistor T3*a* includes a gate electrode connected to a node Qb_o, a drain electrode connected to a node Qh_o, and a source electrode to which a low-potential power supply voltage GVSS2 is applied. The transistor T31*a* includes a gate electrode connected to a node Qb_e, a drain electrode connected to a node Q_o, and a source electrode connected to a node Qh_o. The transistor T31*b* includes a gate electrode connected to a node Qb_e, a drain electrode connected to a node Qh_o, and a source electrode to which a low-potential power supply voltage GVSS2 is applied. The transistor T3*nb* includes a gate electrode to which a global start pulse (Vsp) is applied, a drain electrode connected to a node Q_o, and a source electrode connected to the node Qh_o. The transistor T3*nc* includes a gate electrode to which a global start pulse (Vsp) is applied, a drain electrode connected to a node Qh_o, and a source electrode connected to a low-potential power supply voltage GVSS2.

According to an example embodiment of the present disclosure, transistors T1, T1*a*, T3*n*, T3*na*, T3, T3*a*, T3*nb*, and T3*nc* of the input block (BK2) may each include a thin film transistor unit (10*b*, 10*c*) according to an example embodiment of the present disclosure.

The inverter block (BK3) deactivates the potential of node Qb_o to the low-potential power voltage GVSS2 according to the carry signal C(n−3). The inverter block (BK3) deactivates the potential of node Qb_o to the low-potential power voltage GVSS2 according to the activation potential of node Q_o. The inverter block (BK3) applies the power voltage GVDD_o to the node N4 to activate the potential of node Qb_o to the power voltage GVDDo. The inverter block (BK3) deactivates the potential of the node N4 to the low-potential power voltage GVSS2 according to the activation potential of node Q_e.

For this purpose, the inverter block (BK3) includes a plurality of transistors (T4, T41, T4*q*, T4*q*', T5, T5*q*). The transistor T4 includes a gate electrode connected to a node N4, a drain electrode to which a power supply voltage GVDD_o is applied, and a source electrode connected to a node Qb_o. The transistor T41 includes a gate electrode and a drain electrode to which a power supply voltage GVDD_o is applied, and a source electrode connected to the node N4. The transistor T4*q* includes a gate electrode connected to a node Q_o, a drain electrode connected to a node N4, and a source electrode connected to a low-potential power supply voltage GVSS1. The transistor T4*q*' includes a gate electrode connected to a node Q_e, a drain electrode connected to a node N4, and a source electrode to which a low-potential power supply voltage GVSS1 is applied. Transistor T5 includes a gate electrode to which a carry signal C(n−3) is applied, a drain electrode connected to node Qb_o, and a source electrode to which a low-potential power supply voltage GVSS2 is applied. Transistor T5*q* includes a gate electrode connected to node Q_o, a drain electrode connected to node Qb_o, and a source electrode to which a low-potential power supply voltage GVSS2 is applied.

The output block (BK4) outputs a carry shift clock CRCLK(n) as a carry signal C(n) when the potential of the node Q_o is boosted from voltage level L2 to L3, and outputs a low-potential power supply voltage GVSS2 as a carry signal C(n) when the potential of the node Qb_o is activated to voltage level L2 or when the potential of the node Qb_e is activated to voltage level L2. The output block (BK4) outputs a scan shift clock SCCLK(n) as a gate pulse SCOUT(n) for image display when the potential of the node Q_o is boosted from level L2 to L3, and outputs a low-potential power supply voltage GVSS0 as a gate pulse SCOUT(n) for image display when the potential of the node Qb_o is activated to voltage level L2 or when the potential of the node Qb_e is activated to voltage level L2. The output block (BK4) outputs the sense shift clock SECLK(n) to the sense signal SEOUT(n) when the potential of node Q_o is boosted from level L2 to L3, and outputs the low-voltage power supply voltage GVSS0 to the sense signal SEOUT(n) when the potential of node Qb_o is activated to voltage level L2 or when the voltage of node Qb_e is activated to voltage level L2.

For this purpose, the output block (BK4) includes a plurality of pull-up transistors (T6*a*, T6*b*, T6*c*), a plurality of pull-down transistors (T7*a*, T7*a*', T7*b*, T7*b*', T7*c*, T7*c*'), and a plurality of capacitors (Cap_CR, Cap_SC, Cap_SE). The pull-up transistor Toa includes a gate electrode connected to the node Q_o, a drain electrode to which a carry shift clock CRCLK(n) is applied, and a source electrode connected to the node N5. The capacitor Cap_CR is connected between the node Q_o and the node N5. The pull-up transistor T6*b* includes a gate electrode connected to the node Q_o, a drain electrode to which a scan shift clock SCCLK(n) is applied, and a source electrode connected to the node N6. The capacitor Cap_SC is connected between the node Q_o and the node N6. The pull-up transistor T6*c* includes a gate electrode connected to the node Q_o, a drain electrode to which a sense shift clock SECLK(n) is applied, and a source electrode connected to the node N7. A capacitor Cap_SE is connected between the node Q_o and the node N7. The pull-down transistor T7*a* includes a gate electrode connected to the node Qb_o, a drain electrode connected to the node N5, and a source electrode connected to a low-potential power supply voltage GVSS2. The pull-down transistor T7*a*' includes a gate electrode connected to the node Qb_e, a drain electrode connected to the node N5, and a source electrode connected to a low-potential power supply voltage GVSS2. The pull-down transistor T7*b* includes a gate electrode connected to the node Qb_o, a drain electrode connected to the node N6, and a source electrode connected to a low-potential power supply voltage GVSS0. The pull-down transistor T7*b*' includes a gate electrode connected to the node Qb_e, a drain electrode connected to the node N6, and a source electrode connected to a low-potential power supply voltage GVSS0. The pull-down transistor T7*c* includes a gate electrode connected to the node Qb_o, a drain electrode connected to the node N7, and a source electrode connected to the low-potential power supply voltage GVSS0. The pull-down transistor T7*c*' includes a gate electrode connected to the node Qb_e, a drain electrode connected to the node N7, and a source electrode connected to the low-potential power supply voltage GVSS0.

According to an example embodiment of the present disclosure, transistors T6*a*, T6*b*, T6*c*, T7*b*, and T7*c* of the output block (BK4) may each include thin film transistor units (10*b*, 10*c*) according to an example embodiment of the present disclosure.

Figure 9:
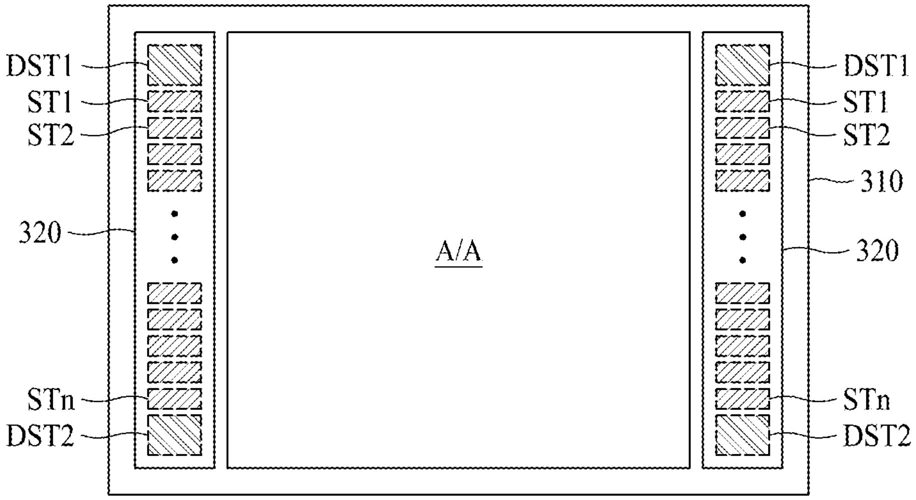
FIG. 9 is a drawing showing an example arrangement of stages within the display panel.

FIG. 9 is a drawing showing the arrangement of the stage (ST) within the display panel (310).

Figure 10:
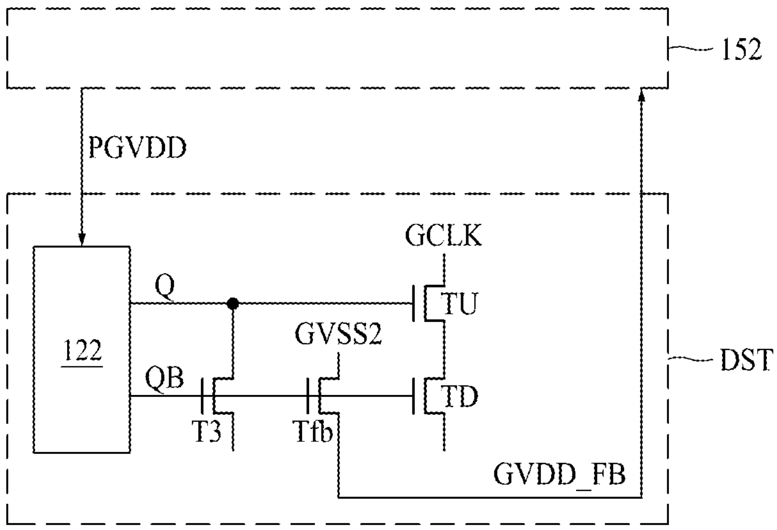
FIG. 10 is a diagram showing an example structure for sensing and compensating for deterioration of a gate driving circuit.

FIG. 10 is a drawing showing a structure for sensing and compensating for deterioration of a gate driving circuit (320).

According to an example embodiment of the present disclosure, the gate driving circuit (320) includes n stages (ST1 to STn), a front dummy stage (DST1) positioned in front of the first stage (ST1), and a rear dummy stage (DST2) positioned in the rear of the nth stage (STn).

FIG. 9 illustrates a gate driving circuit (320) disposed on the left and right sides of the display panel (310) including n stages (ST1 to STn), a front dummy stage (DST1) disposed in front of the first stage (ST1), and a rear dummy stage (DST2) disposed in the rear of the nth stage (STn).

The front dummy stage (DST1) and the rear dummy stage (DST2) are not connected to the gate line (GL). The front dummy stage (DST1) and the rear dummy stage (DST2) do not output a scan signal (SCAN) but only a carry signal. The front dummy stage (DST1) and the rear dummy stage (DST2) are dependently connected to the stage (ST) and have substantially the same circuit configuration as that stage (ST).

As shown in FIGS. 9 and 10, a front dummy stage (DST1) and a rear dummy stage (DST2) having a feedback transistor (Tfb) built into a portion of a display panel (310) are included.

For example, a front dummy stage (DST1) and a rear dummy stage (DST2) including a feedback transistor (Tfb) may be positioned at the upper, lower, left, and right corners of the display panel (310) to compensate for the deterioration distribution of the display panel (310).

FIG. 9 illustrates a front dummy stage (DST1) and a rear dummy stage (DST2) being disposed at the upper, lower, left, and right corners of the display panel (310).

In this case, the feedback voltage (GVDD_FB) is provided from the front dummy stage (DST1) and the rear dummy stage (DST2) disposed at the upper, lower, left, and right corners of the display panel (310), and the deterioration state of the stage (ST) according to the position of the display panel (310) can be determined.

As a result, it is possible to detect the deterioration state of the stage (ST) according to the position of the display panel (310) and generate a compensation high-potential gate voltage (PGVDD) by reflecting the deterioration state according to the position of the display panel (310) (see FIG. 10).

Meanwhile, the display device (1000) can also check whether the feedback transistor (Tfb) built into the front dummy stage (DST1) and the rear dummy stage (DST2) is defective by using the high-potential gate voltage (PGVDD) for compensation.

FIG. 10 illustrates the arrangement of a dummy stage (DST) as an example of a front dummy stage (DST1) and a rear dummy stage (DST2). The dummy stage (DST) includes a feedback transistor (Tfb).

The feedback transistor (Tfb) has its gate electrode connected to the QB node, and its drain electrode is connected to the low-potential power supply voltage GVSS2. In addition, its source electrode is connected to the feedback line.

Accordingly, the compensation circuit (152) receives a feedback voltage (GVDD_FB) through a feedback transistor (Tfb) configured in the dummy stage (DST) and generates a compensation high-potential gate voltage (PGVDD) applied to the stage (ST).

Descriptions of the control circuit (122), gate clock (GCLK), pull-up transistor (TU), and pull-down transistor (TD) illustrated in FIG. 10 are omitted as they overlap with the description in FIG. 7. In addition, transistor T3 illustrated in FIG. 10 corresponds to T3 illustrated in FIG. 8, and any overlapping descriptions are omitted.

According to an example embodiment of the present disclosure, each of the feedback transistors (Tfb) of the dummy stage (DST) may include a thin film transistor unit (10*b*, 10*c*) according to an example embodiment of the present disclosure.

According to the present disclosure, the following advantageous effects may be obtained.

A thin film transistor unit according to an example embodiment of the present disclosure can have a reduced heat generation temperature by crossing heating sources.

A display device according to an example embodiment of the present disclosure including such a thin film transistor unit may have a narrow bezel.

It will be apparent to those skilled in the art that the present disclosure described above is not limited by the above-described example embodiments and the accompanying drawings, and that various substitutions, modifications and variations can be made in the present disclosure without departing from the spirit or scope of the disclosures. Consequently, the scope of the present disclosure may be defined by the accompanying claims and their equivalents, and it is intended that all variations or modifications derived from the meaning, scope, and equivalent concept of the claims fall within the scope of the present disclosure.

What is claimed is:

1. A thin film transistor unit, comprising:

a first terminal;

a first thin film transistor including a first active layer, a first gate electrode, a first source electrode, and a first drain electrode;

a second thin film transistor including a second active layer, a second gate electrode, a second source electrode, and a second drain electrode;

a third thin film transistor including a third active layer, a third gate electrode, a third source electrode, and a third drain electrode;

a fourth thin film transistor including a fourth active layer, a fourth gate electrode, a fourth source electrode, and a fourth drain electrode; and a second terminal, wherein a same gate voltage is configured to be simultaneously applied to the first gate electrode, the second gate electrode, the third gate electrode, and the fourth gate electrode, wherein the first terminal is connected to the first drain electrode and the second drain electrode, wherein the second terminal is connected to the third source electrode and the fourth source electrode, wherein the third drain electrode is connected to the fourth drain electrode only via the first source electrode, and is connected to the fourth drain electrode only via the second source electrode, wherein the first thin film transistor and the fourth thin film transistor are disposed adjacently along a first direction in a plan view, and wherein the second thin film transistor and the third thin film transistor are disposed adjacently along the first direction in the plan view.

2. The thin film transistor unit of claim 1, wherein a voltage input to the first terminal is higher than a voltage input to the second terminal.

3. The thin film transistor unit of claim 1, wherein the first gate electrode is connected to the second gate electrode only via the third gate electrode, and is connected to the second gate electrode only via the fourth gate electrode.

4. The thin film transistor unit of claim 1, wherein:

the first thin film transistor and the third thin film transistor are disposed adjacently along a second direction perpendicular to the first direction in the plan view; and the second thin film transistor and the fourth thin film transistor are disposed adjacently along the second direction in the plan view.

5. The thin film transistor unit of claim 4, wherein the first thin film transistor and the second thin film transistor are disposed adjacently along a diagonal direction between the first direction and the second direction in the plan view.

6. The thin film transistor unit of claim 4, wherein:

the first active layer, the second active layer, the third active layer, and the fourth active layer form a square in which the first active layer, the second active layer, the third active layer, and the fourth active layer are respectively positioned at corners of the square in the plan view; and the first active layer and the second active layer are positioned on a diagonal of the square, and the third active layer and the fourth active layer are positioned on another diagonal of the square.

7. The thin film transistor unit of claim 1, wherein the first active layer, the second active layer, the third active layer, and the fourth active layer are spaced apart from each other.

8. The thin film transistor unit of claim 1, further including a third terminal connected to the first source electrode, the second source electrode, the third drain electrode, and the fourth drain electrode.

9. The thin film transistor unit of claim 1, wherein the first source electrode, the second source electrode, the third source electrode, the fourth source electrode, the first drain electrode, the second drain electrode, the third drain electrode, the fourth drain electrode, the first gate electrode, the second gate electrode, the third gate electrode, and the fourth gate electrode are disposed on a same layer.

10. A display device, comprising:

a display panel in which a plurality of pixels are disposed; and a gate driving circuit configured to supply a plurality of scan signals to the display panel through a plurality of gate lines, wherein the gate driving circuit includes a stage for supplying the scan signals, and wherein the stage includes the thin film transistor unit of claim 1.

11. A display device, comprising:

a display panel in which a plurality of pixels are disposed; and a gate driving circuit configured to supply a plurality of scan signals to the display panel through a plurality of gate lines, wherein the gate driving circuit includes:

a stage for supplying the scan signals; and a front dummy stage and a rear dummy stage dependently connected to the stage, wherein the front dummy stage and the rear dummy stage include a feedback transistor, and wherein the feedback transistor includes the thin film transistor unit of claim 1.

12. The display device of claim 11, wherein the front dummy stage and the rear dummy stage are disposed in a corner area of the display panel.

* * * * *